United States Patent
Greenberg et al.

(10) Patent No.: US 11,525,920 B2
(45) Date of Patent: Dec. 13, 2022

(54) SYSTEM AND METHOD FOR DETERMINING RANGE-RATE AND RANGE EXTENT OF A TARGET

(71) Applicant: RAYTHEON COMPANY, Waltham, MA (US)

(72) Inventors: Adam Hodge Greenberg, Los Angeles, CA (US); Eran Marcus, Culver City, CA (US)

(73) Assignee: RAYTHEON COMPANY, Waltham, MA (US)

(*) Notice: Subject to any disclaimer, the term of this patent is extended or adjusted under 35 U.S.C. 154(b) by 400 days.

(21) Appl. No.: 16/863,064

(22) Filed: Apr. 30, 2020

(65) Prior Publication Data
US 2022/0365215 A1    Nov. 17, 2022

(51) Int. Cl.
*G01S 17/66* (2006.01)
*G01S 17/10* (2020.01)
(Continued)

(52) U.S. Cl.
CPC .............. *G01S 17/66* (2013.01); *G01S 7/292* (2013.01); *G01S 7/415* (2013.01); *G01S 7/487* (2013.01); *G01S 17/10* (2013.01)

(58) Field of Classification Search
CPC .......... G01S 17/66; G01S 7/292; G01S 7/415; G01S 7/487; G01S 17/10
See application file for complete search history.

(56) References Cited

U.S. PATENT DOCUMENTS

| 4,527,276 A | 7/1985 | Gutleber |
| 9,858,304 B2 | 1/2018 | Marcus et al. |

(Continued)

FOREIGN PATENT DOCUMENTS

| CN | 104730535 A | 6/2015 |
| CN | 104168066 B | 8/2016 |

(Continued)

OTHER PUBLICATIONS

International Search Report for corresponding International Application No. PCT/US2020/066674, filed Dec. 22, 2020, International Search Report dated Mar. 30, 2021 and mailed Apr. 21, 2021 (5 pgs.).

(Continued)

*Primary Examiner* — Jonathan M Hansen
(74) *Attorney, Agent, or Firm* — Lewis Roca Rothgerber Christie LLP

(57) ABSTRACT

A target acquisition system includes a transmitter configured to emit a plurality of pulses at a plurality of transmit times toward a target, a receiver configured to detect a plurality of photon arrival events at a plurality of receive times, and a processor configured to determine a range of the target and a range-rate of the target by identifying a subset of the receive times and a subset of the transmit times, generating scaled transmit times based on the subset of the transmit times and a plurality of trial target velocities relative to the receiver, cross-correlating the scaled transmit times and the subset of the received times to generate a plurality of cross-correlation power values, and calculating the range and the range-rate of the target based on the plurality of cross-correlation power values.

20 Claims, 4 Drawing Sheets

(51) Int. Cl.
G01S 7/41 (2006.01)
G01S 7/292 (2006.01)
G01S 7/487 (2006.01)

(56) References Cited

U.S. PATENT DOCUMENTS

| | | | |
|---|---|---|---|
| 10,371,818 B2 | 8/2019 | Marcus et al. | |
| 2008/0259312 A1* | 10/2008 | Carnegie | G01S 7/4868 356/28 |
| 2017/0329010 A1 | 11/2017 | Warke et al. | |
| 2018/0299536 A1 | 10/2018 | Marron et al. | |
| 2018/0364360 A1* | 12/2018 | Zellinger | G01S 7/497 |
| 2020/0292706 A1* | 9/2020 | Hexsel | G01S 17/58 |

FOREIGN PATENT DOCUMENTS

| | | |
|---|---|---|
| EP | 1 884 800 A1 | 2/2008 |
| EP | 2 694 996 A1 | 2/2014 |
| WO | WO 2017/205171 A1 | 11/2017 |
| WO | WO 2018/194747 A1 | 10/2018 |

OTHER PUBLICATIONS

Written Opinion of the International Searching Authority for related International Application No. PCT/US2020/066666, filed Dec. 22, 2020, Written Opinion of the International Searching Authority dated Apr. 6, 2021 (7 pgs.).
Gunzung Kim, et al. "Suitable Combination of Direct Intensity Modulation and Spreading Sequence for LIDAR with Pulse Coding", Sensors, vol. 18, No. 12, Nov. 30, 2018 (pp. 1-22).
International Search Report for related International Application No. PCT/US2020/066481, filed Dec. 21, 2020, International Search Report dated Mar. 23, 2021 and mailed Apr. 1, 2021 (5 pgs.).
Written Opinion of the International Searching Authority for related International Application No. PCT/US2020/066481, filed Dec. 21, 2020, Written Opinion of the International Searching Authority dated Apr. 1, 2021 (5 pgs.).
International Search Report for related International Application No. PCT/US2020/066666, filed Dec. 22, 2020, International Search Report dated Mar. 25, 2021 and mailed Apr. 6, 2021 (4 pgs.).
Written Opinion of the International Searching Authority for related International Application No. PCT/US2020/066666, filed Dec. 22, 2020, Written Opinion of the International Searching Authority dated Apr. 6, 2021 (6 pgs.).
Fluckiger, D.U. et al., "Optimal pseudorandom pulse position modulation ladar waveforms," Applied Optics, Mar. 20, 2015, vol. 54, No. 9, 4 pages.
Bansal, S., et al., "Nature-inspired metaheuristic algorithms to find near-OGR sequences for WDM channel allocation and their performance comparison," Opten Math. 2017; 15:520-547.
Dimitromanolakis, A., "Analysis of the Golomb Ruler and the Sidon Set Problems, and Determination of Large, Near-Optimal Golomb Rulers," Department of Electronic and Computer Engineering Technical University of Crete, Jun. 2002, 118 pages.
Erdos, P., et al., "On a Problem of Sidon in Additive Number Theory, and on Some Related Problems," Journal of the London Mathematical Society, vol. 16, 1941, 4 pages.
Gagliardi, R., et al., "Acquisition Sequences in PPM Communications", IEEE Transactions on Information Theory, vol. IT-33, No. 5, Sep. 1987, 7 Pages.
Hiskett, P.A., et al., "A photon-counting time-of-flight ranging technique developed for the avoidance of range ambiguity at gigahertz clock rates," Optics Express. Sep. 1, 2008, vol. 16, No. 18, 14 pages.
Mao, X., et al., "Pulse position modulation for compact all-fiber vehicle laser rangefinder development," OpticalEngineering. SPIEDigitalLibrary.org, 56(10), Oct. 2017, 9 pages.
Milstein, A.B., et al., "Acquisition algorithm for direct-detection ladars with Geiger-mode avalanche photodiodes," Applied Optics, vol. 47, No. 2, Jan. 10, 2008, 16 pages.

* cited by examiner

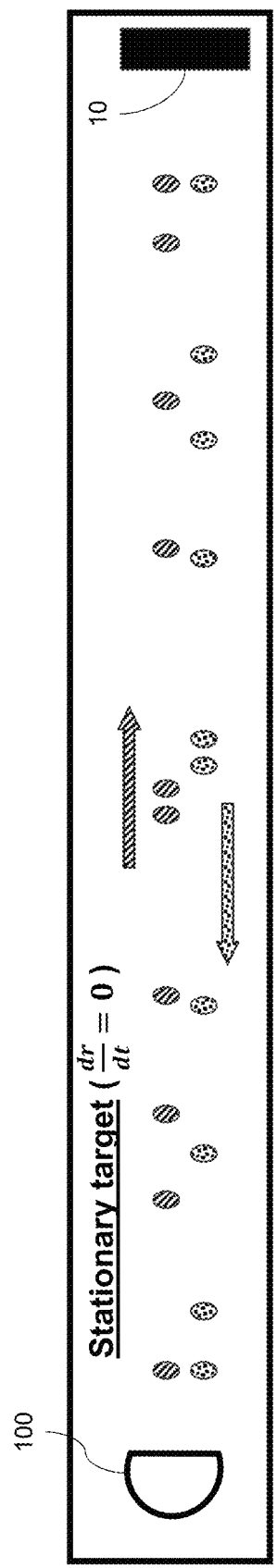
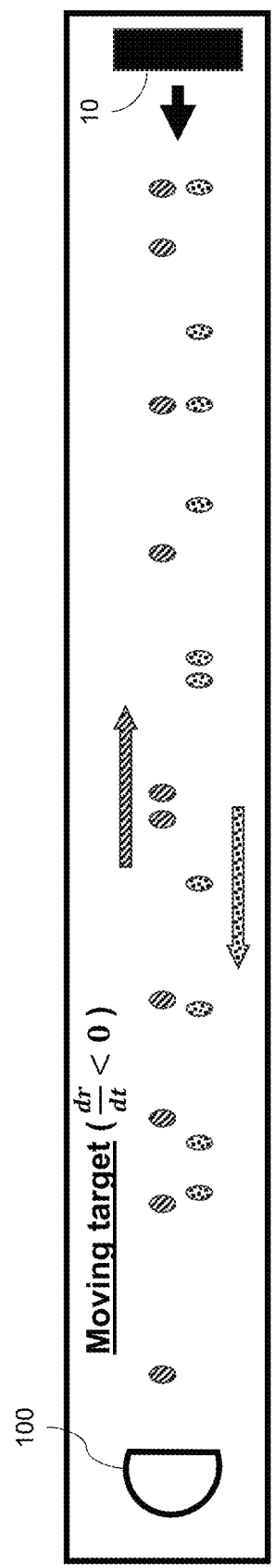
FIG. 2A
FIG. 2B

SYSTEM AND METHOD FOR DETERMINING RANGE-RATE AND RANGE EXTENT OF A TARGET

GOVERNMENT LICENSE RIGHTS

This invention was made with Government support. The Government has certain rights in the invention.

FIELD

Aspects of the present disclosure relate to target acquisition.

BACKGROUND

Pulsed laser radar sensors, also known as lidars or ladars, are active sensing systems that determine the range to a target by measuring the time of flight of short laser pulses reflected off of the target. A lidar system generally includes a laser transmitter and an optical receiver. The transmitter is capable of generating laser pulses when commanded, and of directing these pulses in a particular direction. The receiver includes an optical system capable of collecting light reflected from the target, and a photodetector that can record the arrival of reflected light. An aspect of the return processing is the ability to determine target characteristics accurately despite complex scattering of the transmitted light, imperfect detection of the returns, unwanted detections due to ambient light and electrical noise, and modulation of the return due to target motion, among other practical complications.

A common issue faced when operating a LiDAR in range acquisition mode is overcoming the range ambiguity problem. The problem arises when using a periodically pulsed waveform, as the time of flight for a single received pulse cannot be uniquely determined if multiple pulses are in the air at once. One approach is decreasing the transmit pulse repetition frequency (PRF), but this solution reduces the LiDAR's duty factor, particularly for targets with large range uncertainties. Another approach resolves this issue by transmitting pulses with a nominal repetition frequency, but the timing for each individual pulse is dithered with respect to the nominal transmit time.

Generally, target acquisition is performed in two steps: initially, the target is ranged using dithered/aperiodic waveforms and then, the range-rate/velocity of the target is determined using a standard periodic pulse-train. However, when the target is moving, the signal-to-noise ratio (SNR) of returned pulses decreases as the target's speed increases. As a result, low-return, high-velocity targets may fall below background levels, and these targets may become undetectable.

The above information disclosed in this Background section is only for enhancement of understanding of the background of the disclosure and therefore it may contain information that does not constitute prior art.

SUMMARY

Aspects of example embodiments of the present disclosure are directed to target acquisition system capable of detecting and characterizing low-return, high-velocity targets by determining both range and range-rate concurrently (e.g., simultaneously) using the same initial set of measured data from the same waveform.

According to some embodiments, the target acquisition system utilizes a pulse-position-modulated (PPM) waveform, whereby data are collected, and then the outgoing waveform is cross-correlated with the measured returns. The process of cross-correlation is repeated with multiple variations of the transmitted waveform, each variation being temporally scaled according to a different trial target velocity. The cross-correlation peak magnitude serves as a metric for transmit/receive alignment, and the target acquisition system according to some embodiments maximizes the cross-correlation peak magnitude with respect to this temporal scaling to determine both the target range and range-rate concurrently (e.g., simultaneously), with the same set of data. Furthermore, the target acquisition system utilizes the extracted velocity, along with knowledge of the transmitted waveform, to project target returns into a stationary reference frame, allowing for any previously developed feature extraction algorithms to proceed. All steps may be performed on the same initial set of measured data, obviating the need to change waveforms, and also allowing for the detection of lower-SNR targets than may have been previously possible.

According to some embodiments of the present disclosure, there is provided a target acquisition system including: a transmitter configured to emit a plurality of pulses at a plurality of transmit times toward a target; a receiver configured to detect a plurality of photon arrival events at a plurality of receive times; and a processor configured to concurrently determine a range of the target and a range-rate of the target by: identifying a subset of the receive times and a subset of the transmit times, wherein pairwise differences between the subset of the receive times and the subset of the transmit times correspond to roundtrips between a minimum range and a maximum range; generating scaled transmit times based on the subset of the transmit times and a plurality of trial target velocities relative to the receiver; cross-correlating the scaled transmit times and the subset of the received times to generate a plurality of cross-correlation power values; and calculating the range and the range-rate of the target based on the plurality of cross-correlation power values.

In some embodiments, the identifying of the subsets of the receive times and the scaled transmit times includes: identifying, for each transmit time of the plurality of transmit times, an earliest receive time and a latest receive time, wherein a difference between the earliest receive time and the transmit time is greater than or equal to a time lag corresponds to the minimum range, and wherein a difference between the latest receive time and the transmit time is less than or equal to a time lag corresponding to the maximum range.

In some embodiments, the identifying the earliest receive time and the latest receive time includes binary searching the plurality of receive times.

In some embodiments, the generating of the scaled transmit times includes: generating a first subset of the scaled transmit times by multiplying the subset of the transmit times by a first scaling factor corresponding to a first trial velocity; and generating a second subset of the scaled transmit times by multiplying the subset of the transmit times by a second scaling factor corresponding to a second trial velocity, wherein the scaled transmit times include the first and second subset of the scaled transmit times.

In some embodiments, the first scaling factor $\gamma_v$ is expressed as $\gamma_v \equiv 1+2v/c$, where v is the first trial velocity and c is the speed of light.

In some embodiments, the cross-correlating the scaled transmit times and the subset of the received times includes: generating a plurality of histograms, each one of the plurality of histograms being a histogram of pairwise differences between the subset of the receive times and ones of the scaled transmit times corresponding to one of the plurality of trial target velocities, wherein the plurality of cross-correlation power values are generated based on values of the plurality of histograms.

In some embodiments, the cross-correlating the scaled transmit times and the subset of the received times further includes: generating a 2-dimensional array, each row of the 2-dimensional array being a histogram of the plurality of histograms corresponding to a different one of the plurality of trial target velocities, wherein rows of the 2-dimensional array are sorted based on the trial target velocities.

In some embodiments, the 2-dimensional array represents the cross-correlation power values as a function of photon round trip time and velocity.

In some embodiments, the pairwise differences between the subset of the receive times and ones of the scaled transmit times are quantized.

In some embodiments, the calculating the range and the range-rate of the target includes: identifying a peak cross-correlation value from among the plurality of cross-correlation power values, and a lag associated with the peak cross-correlation value; calculating the range of the target based on the lag; and calculating the range-rate based on a scaling factor associated with the peak cross-correlation value.

In some embodiments, the plurality of transmit times include dithered pulse timings from a nominal repetition frequency based on a pulse position modulated code.

In some embodiments, the pulse position modulated code has auto-correlation side lobes less than or equal to one.

According to some embodiments of the present disclosure, there is provided a method of target acquisition including: receiving, by a processor of a target acquisition system, a plurality of transmit times corresponding to a plurality of pulses transmitted toward a target; receiving, by the processor, a plurality of receive times corresponding to a plurality of photon detection events; and determining, by the processor, a range of the target and a range-rate of the target by: identifying a subset of the receive times and a subset of the transmit times, wherein pairwise differences between the subset of the receive times and the subset of the transmit times correspond to roundtrips between a minimum range and a maximum range; generating scaled transmit times based on the subset of the transmit times and a plurality of trial target velocities relative to the receiver; cross-correlating the scaled transmit times and the subset of the received times to generate a plurality of cross-correlation power values; and calculating the range and the range-rate of the target based on the plurality of cross-correlation power values.

In some embodiments, the identifying of the subsets of the receive times and the scaled transmit times includes: identifying, for each transmit time of the plurality of transmit times, an earliest receive time and a latest receive time, wherein a difference between the earliest receive time and the transmit time is greater than or equal to a time lag corresponds to the minimum range, and wherein a difference between the latest receive time and the transmit time is less than or equal to a time lag corresponding to the maximum range.

In some embodiments, the generating of the scaled transmit times includes: generating a first subset of the scaled transmit times by multiplying the subset of the transmit times by a first scaling factor corresponding to a first trial velocity; and generating a second subset of the scaled transmit times by multiplying the subset of the transmit times by a second scaling factor corresponding to a second trial velocity, wherein the scaled transmit times include the first and second subset of the scaled transmit times.

In some embodiments, the first scaling factor $\gamma_v$ is expressed as $\gamma_v \equiv 1+2v/c$, where v is the first trial velocity and c is the speed of light.

In some embodiments, the cross-correlating the scaled transmit times and the subset of the received times includes: generating a plurality of histograms, each one of the plurality of histograms being a histogram of pairwise differences between the subset of the receive times and ones of the scaled transmit times corresponding to one of the plurality of trial target velocities, wherein the plurality of cross-correlation power values are generated based on values of the plurality of histograms.

In some embodiments, the cross-correlating the scaled transmit times and the subset of the received times further includes: generating a 2-dimensional array, each row of the 2-dimensional array being a histogram of the plurality of histograms corresponding to a different one of the plurality of trial target velocities, wherein rows of the 2-dimensional array are sorted based on the trial target velocities.

In some embodiments, the 2-dimensional array represents the cross-correlation power values as a function of photon round trip time and velocity.

In some embodiments, the calculating the range the range-rate of the target includes: identifying a peak cross-correlation value from among the plurality of cross-correlation power values, and a lag associated with the peak cross-correlation value; calculating the range of the target based on the lag; and calculating the range-rate based on a scaling factor associated with the peak cross-correlation value.

BRIEF DESCRIPTION OF THE DRAWINGS

These and other features of some example embodiments of the present disclosure will be appreciated and understood with reference to the specification, claims, and appended drawings, wherein:

FIGS. 2A-2B illustrate the effect of a moving target on the timing of return pulses relative to a stationary target, according to some examples.

DETAILED DESCRIPTION

The detailed description set forth below in connection with the appended drawings is intended as a description of some example embodiments of a system and a method for target ranging provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In the related art, targets are ranged using dithered waveforms, and then the range-rate is determined using a standard periodic pulse-train. According to some embodiments of the present disclosure, the target acquisition system is capable of extracting, and correcting for, range-rate of a target from dithered range acquisition data. The target acquisition system according to some embodiments, can also extract the target range extent directly from the range-rate calculations, without performing any coincidence processing.

Some embodiments of the present disclosure are directed to a target acquisition system using a single form of waveforms to concurrently determine the range and range-rate of even a low-return, high-velocity target. In some embodiments, the target acquisition system transmits a particular pulse-position-modulated (PPM) waveform and cross-correlates the measured returns with multiple variations of the transmitted PPM waveform, which are temporally scaled according to a different trial target velocity. Increasing (e.g., maximizing) the cross-correlation peak magnitude with respect to this temporal scaling allows the target acquisition system to determine both the target range and range-rate concurrently (e.g., simultaneously) with the same set of measured data. In some embodiments, the system employs an efficient process for culling input data to reduce computational load and allow for real-time tracking of fast-moving, low-SNR targets.

Figure 1:
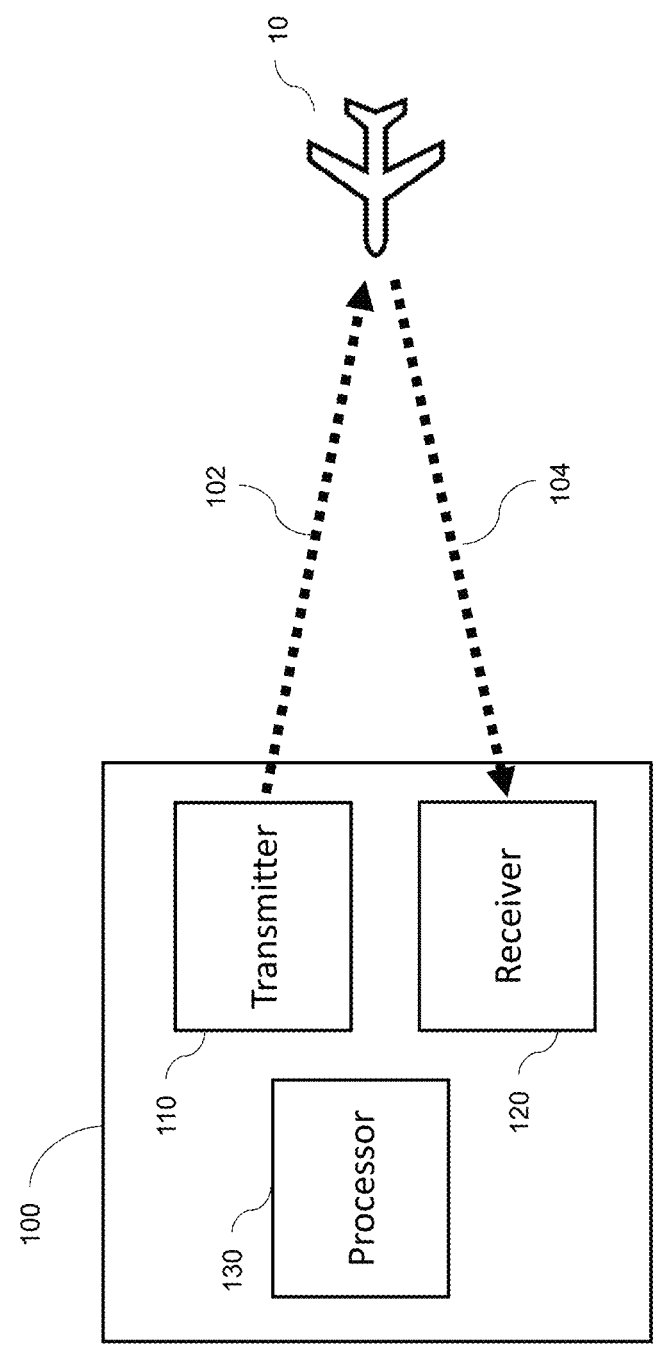
FIG. 1 illustrates a target acquisition system according to some embodiments of the present disclosure.

FIG. 1 illustrates the target acquisition system 100 according to some embodiments of the present disclosure.

According to some embodiments, the target acquisition system 100, which includes a transmitter 110, a receiver 120, and a processor 130, is capable of detecting the range and range-rate of a target 10, which may be a stationary or moving object or vessel (e.g., an airborne or land vessel, a fast-moving projectile, etc.).

The transmitter 110 is configured to generate laser pulses (e.g., pulses of photons) 102 at particular transmit times and to direct these pulses in a desired direction (e.g., in the direction of a target 10). In some examples, the emitted pulses may be about 1 ns to about 25 ns in duration, which may result in range measurements that may be accurate to within a few meters. The receiver (e.g., an optical receiver) 120 includes an optical system capable of collecting light reflected from the target 10 and a photodetector that is configured to record the arrival time of incoming light (e.g., reflected light) 104. The photodetector may be capable of timing the arrival of return pulses with an accuracy similar in scale to the transmitted laser pulse duration.

According to some embodiments, the processor 130 is configured to control the operation of the transmitter 110 and receiver 120, and to concurrently (e.g., simultaneously) determine the range and the range-rate (i.e., velocity) of the target 10 based on the transmit and return times of photons. Henceforth, the terms speed, velocity, and range-rate refer to the velocity of the target 10 relative to the target acquisition system 100 along the range axis (i.e., the line/direction connecting the system 100 and the target 10), and not the cross-range axes that are perpendicular to the range-axis. The processor 130 may accurately determine these target characteristics despite complex scattering of the transmitted light, imperfect detection of the returns, unwanted detections due to ambient light and electrical noise, modulation of the return due to target motion, and/or other practical complications and limitations.

FIGS. 2A-2B illustrate the effect of a moving target on the timing of return PPM pulses relative to a stationary target, according to some examples.

As shown in FIG. 2A, when the target 10 is stationary relative to the target acquisition system 100, the return pulses have the same difference in timings as the transmitted pulses. However, when the target is moving relative to the target acquisition system 100 (as shown in FIG. 2B), each returned pulse has sampled a different round-trip time from the target, therefore the difference in timing between the returned pulses may be different from that of the transmitted pulses. That is, the difference in timings of the return pulses may be perturbed according to the target's velocity/range-rate.

For example, for a set of N transmit times $T_{tx} = \{t_i | 1 \le i \le N, t_1 = 0\}$, the return times $T_{rx}$ from a target at range R and with a range-rate $\dot{R}$ may be expressed as:

$$T' = \{\gamma t_i + t_{RTT} | 1 \le i \le N\} \qquad \text{Equation (1)}$$

where the scaling coefficient $\gamma$ (also referred to as a scaling factor) and the roundtrip time $t_{RTT}$ of the returned pulses may be expressed as:

$$\gamma := \left(1 + \frac{2\dot{R}}{c}\right) \qquad \text{Equation (2)}$$

$$t_{RTT} := \frac{2R}{c} \qquad \text{Equation (3)}$$

where c is the speed of light, and the first pulse is assumed to be transmitted at time 0, for sake of simplicity.

When the target is stationary, the target acquisition system 100 may cross-correlate the measured return timings with the transmitted pulse timings, and the temporal lag corresponding to the correlation maximum may yields the target's round-trip time $t_{RTT}$ or a close approximation thereof. When the target is moving, however, the correlation maximum is reduced, as the return timings no longer simultaneously line up with all of their transmitted counterparts. This is formulaically expressed in Equation 2 as the effect of the scaling coefficient $\gamma$ on contracting or expanding the return pulse timings.

According to some embodiments, the processor 130 scales (e.g., stretches or compresses) the transmit times of the emitted laser pulses according to a plurality of hypothesized velocities and, for each hypothesized velocity, computes a cross-correlation of the scaled transit times with the return times of detection events, and identifies the peak cross-correlation power value for the plurality of hypothesized/trial velocities. Determining the temporal scaling that yields the highest correlation peak value allows the processor 130 to concurrently (e.g., simultaneously) determine both the range and range-rate of the target 10.

Figure 3:
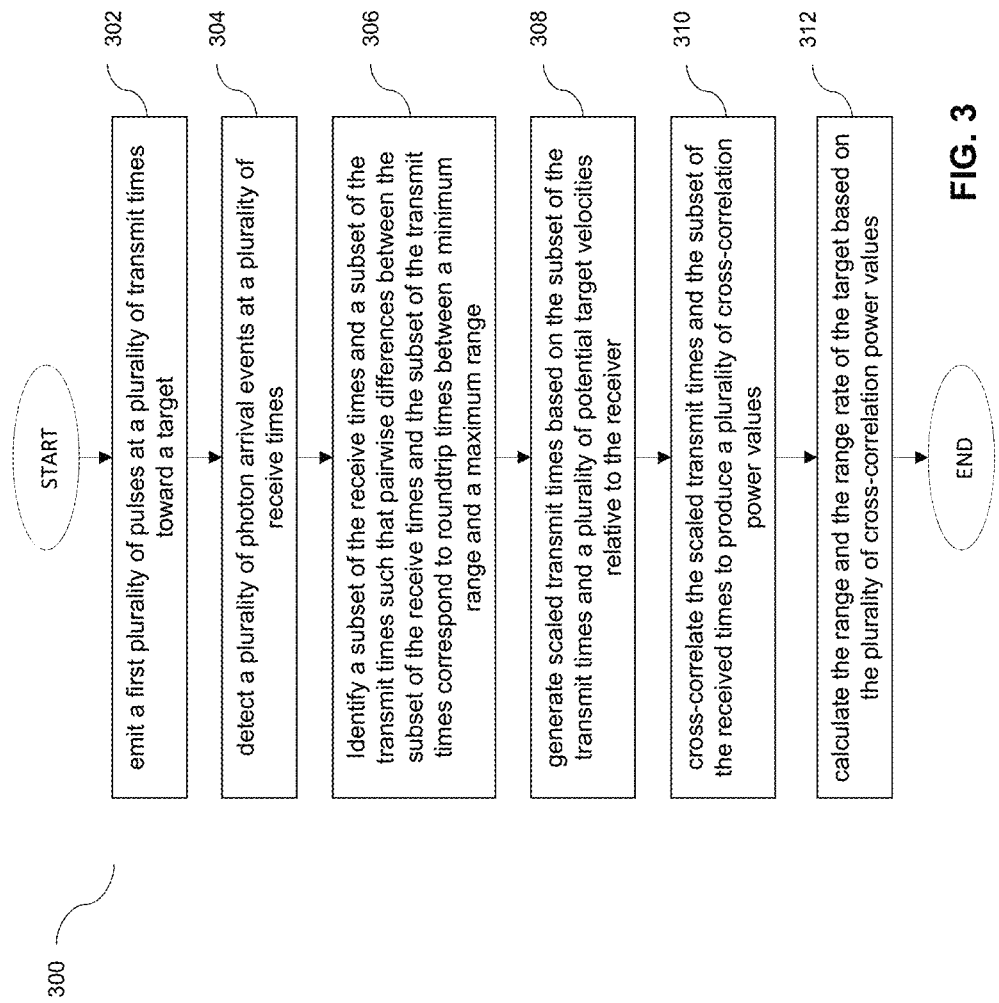
FIG. 3 illustrates a process of target acquisition according to some embodiments of the present disclosure.

FIG. 3 illustrates a process 300 of target acquisition according to some embodiments of the present disclosure.

According to some embodiments, the transmitter 110 to emit a plurality of pulses at a plurality of transmit times $T_{tx}$ toward the target 10 (S302), and the receiver 120 detects a plurality of pulse arrival events at a plurality of receive times $T_{rx}$ and records the receive times for processing (S304). In some examples, the transmit times $T_{tx}$ may include dithered pulse timings from a nominal repetition frequency based on a pulse position modulated code, which has auto-correlation side lobes less than or equal to one. The pulse arrival events may include the detection of one or more of the transmitted pulses that have reflected off of the target 10 and returned to the receiver 120, and may include unwanted detections due to ambient light sources, electrical noise, etc.

According to some embodiments, the processor uses the known transmit times $T_{tx}$ of the transmitter 110 and the recorded receive times $T_{rx}$ from the receiver 120 to concurrently (e.g., simultaneously) determine the range and range-rate (i.e., velocity) of the target 10. As the dwell time of the receiver may be greater than (e.g., significantly greater than) the roundtrip time of a photon from the target 20, many (e.g., most) of the recorded receive times $T_{rx}$ may not be correspond to any transmitted pulse. To improve processing efficiency, the processor 130 identifies a subset of the receive times $T'_{rx}$ and a subset of the transmit times $T'_{tx}$ such that pairwise differences between the subset of the receive times $T'_{rx}$ and the subset of the transmit times $T'_{tx}$ correspond to roundtrip times between a minimum value and a maximum value (S306). The minimum and maximum values of the roundtrip times may be determined from a preset minimum range $r_{min}$ and a preset maximum range $r_{max}$, which may be defined by a user of the system 100, by using the following equations:

$$t_{RTT,min} := \frac{2r_{min}}{c} \quad \text{Equation (4)}$$

$$t_{RTT,max} := \frac{2r_{max}}{c} \quad \text{Equation (5)}$$

In some examples, the processor 130 calculates the time difference between every possible combination of transmit times $T_{tx} = \{t_{tx,1} \ldots t_{tx,N}\}$ and received times $T_{rx} = \{t_{rx,1} \ldots t_{rx,M}\}$ (where N and M are positive integers) and identifies the subset of the receive times $T'_{rx}$ (e.g., the subset of relevant receive times) and the subset of the transmit times $T'_{tx}$ (e.g., the subset of relevant transmit times) such that the pairwise differences lie between the minimum roundtrip time $t_{RTT,min}$ and the maximum roundtrip time $t_{RTT,max}$. Here, the set of relevant pairwise differences may be calculated in O(N×M) time. As the value of N and (in particular) M may be large (e.g., due to a large dwell time of the receiver 120), this process may be time consuming.

According to some embodiments, the processor 130 uses a set of sorted transmit times $T_{tx} = \{t_{tx,1} \ldots t_{tx,N}\}$ and sorted received times $T_{rx} = \{t_{rx,1} \ldots t_{rx,M}\}$ and identifies, for each transmit time $t_{tx,i}$ (where i<N), a subset of the receive times $T'_{rx,i}$ for which the corresponding round trip times lie between the minimum and maximum roundtrip times $t_{RTT,min}$ and $t_{RTT,max}$, in O(log M) time. In some embodiments, the processor 130 does so by: 1) binary searching for the earliest member $t_{rx,a}$ of the receive times $T_{rx}$ such that a difference between the earliest member $t_{rx,a}$ and the transmit time $t_{tx,i}$ is greater than or equal to the minimum roundtrip time $t_{RTT,min}$ (i.e., $t_{rx,a} - t_{tx,i} \geq r_{min} \times 2/c$, a being a positive integer), and by 2) by binary searching for the latest member $t_{rx,b}$ of the receive times $T_{rx}$ and the transmit time $t_{tx,i}$ is less than or equal to the maximum roundtrip time $t_{RTT,max}$ (i.e., $t_{rx,b} - t_{tx,i} \leq r_{max} \times 2/c$, b being a positive integer). Thus, for each transmit time, the relevant subset of the receive times are determined by the earliest and latest members identified above. When no earliest and latest receive members can be determined for a given transmit time $t_{tx,i}$ from the transmit times $T_{tx}$ (e.g., when the transmitted photon corresponding to that transmit time does not return to the receiver 120), that transmit time is excluded from the subset of transmit times $T'_{tx}$.

Because the set of transmit and receive times $T_{tx}$ and $T_{rx}$ are sorted, the identified earliest and latest members of a transmit time, may be used as starting positions for searching for the earliest and latest receive times corresponding to the next transmit time. Therefore, the processor 130 may identify the subset of relevant transmit and receive time pairs in O(N log M) time. For large values of N and M, this represents a significantly less processing time than that of computing the pairwise differences for every possible pairing of transmit and receive times.

Thus, the processor 130 may generate, according to some embodiments, a table through which it can identify the subset of relevant receive times $T'_{rx,i}$ for each transmit time $t_{tx,i}$ of the subset of relevant transmit times $T'_{tx}$. An example of the generated table is shown as Table 1 below. According to some examples, the table may have three columns: the first column may indicate the index number i of the transmit time $t_{tx,i}$ from among the subset of transmit times $T'_{tx}$, and the second and third columns may respectively indicate the start index and end indices of the sorted received times $T_{rx} = \{t_{rx,1} \ldots t_{rx,M}\}$ that define the subset of relevant receive times $r_{rx,i}$ corresponding to the index i of the transmit time $t_{tx,i}$.

TABLE 1

| Transmit Time Index | Receive Time Start Index | Receive Time End Index |
|---|---|---|
| 1 | 1157 | 1285 |
| 2 | 1184 | 1312 |
| 3 | 1200 | 1328 |
| ... | | |

In the example of Table 1, the subset of receive times $T'_{rx,1}$ for the first transmit time $t_{tx,1}$ consists of the 1157th to the 1285th receive times detected by the receiver 120.

In some examples, the receive time start and end indices for each transmit time $t_{tx,i}$ may be the member indices of the identified earliest and latest members a and b, respectively. However, embodiments of the present disclosure are not limited thereto.

In some embodiments, the receive time start and end indices are padded to account for the scaling effect of different trial target velocities on the transmit times $t_{tx}$. For example, the receive time start index may be one or two lower than the index corresponding to the identified earliest receive member (i.e., a), and the receive time end index may be one or two higher than the index corresponding to the identified latest receive member (i.e., b).

In some examples, the set of transmit times $T_{tx} = \{t_{tx,1} \ldots t_{tx,N}\}$ and received times $T_{rx} = \{t_{rx,1} \ldots t_{rx,M}\}$ are pre-sorted (e.g., from least to greatest time) when received by the processor 130, or the processor 130 may sort them after receiving them from transmitter 110 and receiver 120 and prior to binary searches.

According to some embodiments, the processor 130 generates scaled transmit times based on the subset of the transmit times and a plurality of trial target velocities relative to the receiver (S308). Trial velocities may be determined based on user-inputted scenario specifications, for example, based on knowledge that a vehicle has a maximum possible speed. The velocity resolution $\Delta v$ (i.e., the minimum separation between trial velocities) may be determined based on prior knowledge of the target's extent in range Δr, and the total dwell time $T_d$ of the receiver 120 as $$\Delta v = \frac{\Delta r}{2T_d}.$$

For each trial velocity v, the processor 130 scales the subset of transmit times $T'_{tx}$ by a factor corresponding to the scaling coefficient $\gamma_v$ defined (consistently with Equation (2)) as:

$$\gamma_v = 1 + 2v/c \qquad \text{Equation (6)}$$

to generate scaled transmit times $\gamma_v \times T'_{tx}$.

Because the trial velocity v are extremely low compared to the speed of light c (i.e., v<<c), the corresponding scaling coefficients $\gamma_v$ are all approximately equal to one 1. In other words, the scaled transmit times $\gamma_v \times t_{tx,i}$ will barely deviate from the original transmit times $t_{tx,i}$. As such, the index padding used to generate the receive time start and end indices for each transmit times $t_{tx,i}$ in Table 1 can be small (e.g., one to two indices). In some examples, the index padding is equal to the product of twice the ratio of the maximum trial velocity to the speed of light, with the maximum difference between transmit and receive timings, expressed in units of the temporal sampling interval of the receive timings.

The processor 130 then cross-correlates the scaled transmit times $\gamma_v \times T'_{tx}$, and the subset of the received times $T'_{rx}$ to produce a plurality of cross-correlation power values (S310). In some embodiments, the processor 130 generates, for each trial velocity (or equivalently, each scaled transmit timing subset $\gamma_v \times T'_{tx}$), a histogram of the pair-wise differences between the received time and the scaled transmit times (i.e., $T'_{rx} - \gamma_v \times T'_{tx}$). Referring again to Table 1, the processor 130 calculates, for all scaled transmit times $\gamma_v \times t_{tx,i}$ from among the scaled transmit timing subset $\gamma_v \times T'_{tx}$, all of the pair-wise differences between the scaled transmit time $\gamma_v \times t_{tx,i}$ and all of corresponding members of the subset of receive times $T'_{rx,i}$. The processor 130 uses the totality of the differences calculated for all scaled transmit times from among the scaled transmit timing subset $\gamma_v \times T'_{tx}$ to generate the histogram corresponding to trial velocity v (or equivalently, scaling coefficient $\gamma_v$). The processor 130 may generate this histogram in O(N' M') time, where N' and M' are the lengths of the subset of transmit times $T'_{tx}$ and subset of the receive times $T'_{rx}$, respectively, by accumulating over an array indexed by difference. Here, the subset of transmit and receive times $T'_{tx}$ and $T_{rx}'$ are quantized and the differences $T'_{rx} - \gamma_v \times T'_{tx}$ are also quantized by rounding out the differences to the nearest integer multiple of the timing resolution. Each resulting histogram indicates the cross-correlation power as a function of roundtrip time (between the predefined minimum and maximum ranges $r_{min}$ and $r_{max}$). The resulting histograms for the different trial velocities together allow the processor 130 to determine the cross-correlation power as a function of trial velocity and roundtrip time. An efficient method for computing the cross-correlation based on sparse data (where run time is a function of the number of photo events and not the temporal base line associated with them, as is the case here) is provided in U.S. Pat. No. 9,858,304, the entire content of which is hereby expressly incorporated by reference.

While in the description above, the processor 130 scales the transmit times, embodiments of the present disclosure are not limited thereto. For example, the scaling coefficient $\gamma_r$, may be applied to the receive times from among the subset of the receive times instead of the transmit times.

According some embodiments, the processor concurrently (e.g., simultaneously) calculates the range and the range-rate of the target 10 based on the plurality of cross-correlation power values (S312). In some embodiments, the processor 130 identifies a peak cross-correlation power value (e.g., the highest cross-correlation value) from among the plurality of cross-correlation power values, and determines the lag (e.g., the pair-wise difference value) associated with the peak cross-correlation power value. The range-rate/velocity of the target 10 is the trial velocity associated with the peak cross-correlation power value or equivalently, may be calculated from the scaling coefficient $\gamma_v$ associated with the peak using Equation (6). The lag or pair-wise difference value associated with the peak also represents the roundtrip time $t_{RTT}$, and thus the processor 130 can calculate the range of the target 10 via Equation (3).

In generating the peak cross-correlation value, the processor may construct a 2-dimensional array in which each row of the 2-dimensional (2-D) array is a histogram corresponding to a different trial velocity and each element of the 2-D array corresponds to a cross-correlation power value. The rows of the 2-D array may be sorted based on the trial velocities. The 2-D array may be represented by a 2-D image or heatmap. The identification of the peak value in the 2-D array may be performed by any suitable 2-D peak-finding algorithm know to a person of ordinary skill in the art. For example, the processor 130 may perform a connected component analysis to identify all pixels of this 2-D image that are connected to each other and which have intensities above a set threshold, and then use a centroid process to identify the peak.

Figure 4A:
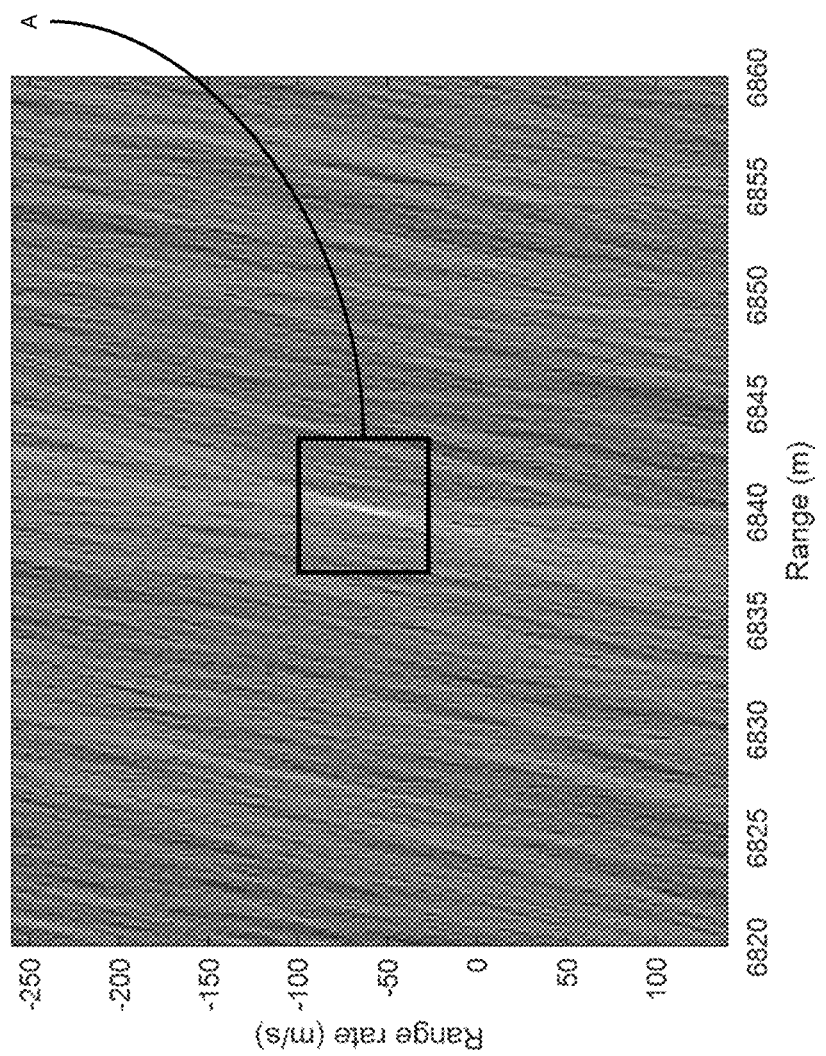
FIG. 4A is a heatmap illustrating cross-correlation values as a function of velocity and range of a simulated target, according to some example embodiments of the present disclosure.
Figure 4B:
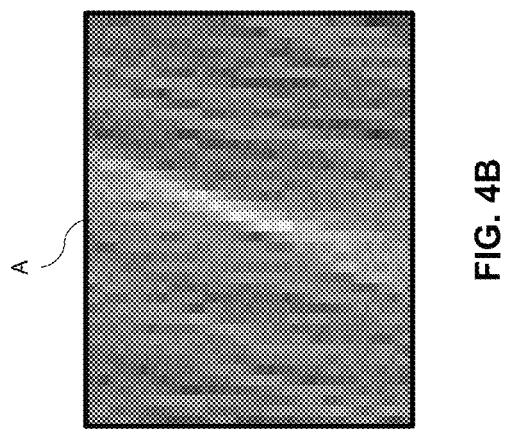
FIG. 4B illustrates a closer view of the region A of the range-velocity space of FIG. 4A.

FIG. 4A is a heatmap illustrating cross-correlation values as a function of velocity and range of a simulated target, according to some example embodiments of the present disclosure. FIG. 4B illustrates a closer view of the region A of the range-velocity space of FIG. 4A. In FIGS. 4A-4B, the magnitudes of the cross-correlation power are illustrated as grayscale values, with lighter colors indicating higher magnitudes and darker colors indicating lower magnitudes.

In the example of FIGS. 4A-4B, each row corresponds to a different trial velocity/hypothesized range-rate, and the series of values along that row form a 1-dimensional cross-correlation function. The 2-D heatmap of FIGS. 4A-4B illustrates minor peaks and troughs, which may be due to background noise and other undesirable effects, and a spread major peak, which represents the intended target. The many peaks and troughs may result from stochastic noise, whereby it is possible to receive a sequence of background photons/events that happen to line up with some of the transmit times, and thus generate local peaks in the cross-correlation power values.

In this example and using the process 300 of FIG. 3, the process 130 detects the peak at a range of about 6840 m with a velocity of about −50 m/s along the range axis and relative to the target acquisition system 100. The spreading of the peak shown in FIGS. 4A-4B may be due to the size, shape, and surface non-uniformities of the target, which may cause the scaled transmit timings to partially align with the received times even when the hypothesized/trial velocity is slightly off from the target velocity. The mismatch between the scaled transmit timings and the received times may increase as the hypothesized/trial velocity moves further away from the target velocity, thus reducing the calculated cross-correlation power (and resulting in darker pixel values in FIGS. 4A-4B).

As the target's velocity changes, the location of the peak in the 2-D heatmap may move up or down (to reflect a higher or lower velocity), however, the magnitude of the peak will not change. As such, the signal-to-noise-ratio (SNR) is no longer a function of the target velocity (unlike the techniques of the related art), which allows for accurate ranging of even fast-moving, low SNR targets (which may not have been possible using techniques of the related art.

As described above, according to some embodiments of the present disclosure, the target acquisition system is capable of transforming raw sensor data (e.g., photon detection events) into a space where targets manifest as peaks in a signal. This transformation may be performed in a streaming manner, which allows for up-to-date real-time knowledge of a target's dynamical state, with a constant latency. Despite the fact that a target's range-rate is not known in advance, the target acquisition system 100 utilizes the fact that the target range-rate has a predictable effect on return timing to estimate the range-rate via hypothesis and test. That is, the target acquisition system 100 applies a series of cross-correlations to the return data, each against the transmit waveform scaled per a different hypothesized range-rate. The target acquisition system 100 may also leverage a baseline sparse cross-correlation algorithm to rapidly calculate each row of a 2D array parametrized by range and range-rate. In this transformed space, a moving target presents as a single peak, for which the range and range-rate can be extracted. Unlike two-step techniques of the related art, the target acquisition process according to some embodiments can work with any transmit waveform, and can therefore be combined with optimal PPM waveforms in range-ambiguous scenarios. Furthermore, because the target acquisition system 100 estimates both state variables simultaneously, it can detect high-speed, low-SNR targets that would be undetectable with any two-step method.

The operations performed by the constituent components of the target acquisition system (e.g., by the processor 130) may be performed by a "processing circuit" that may include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example, a processing circuit may include two processing circuits, an FPGA and a CPU, interconnected on a PWB.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

While the present disclosure has been illustrated and described with reference to the embodiments thereof, it will be apparent to those of ordinary skill in the art that various suitable changes in form and detail may be formed thereto without departing from the spirit and scope of the present disclosure, as defined by the following claims and equivalents thereof.

What is claimed is:

1. A target acquisition system comprising:
a transmitter configured to emit a plurality of pulses at a plurality of transmit times toward a target;
a receiver configured to detect a plurality of photon arrival events at a plurality of receive times; and
a processor configured to concurrently determine a range of the target and a range-rate of the target by:
identifying a subset of the receive times and a subset of the transmit times, wherein pairwise differences between the subset of the receive times and the subset of the transmit times correspond to roundtrips between a minimum range and a maximum range;
generating scaled transmit times based on the subset of the transmit times and a plurality of trial target velocities relative to the receiver;
cross-correlating the scaled transmit times and the subset of the received times to generate a plurality of cross-correlation power values; and
calculating the range and the range-rate of the target based on the plurality of cross-correlation power values.

2. The target acquisition system of claim 1, wherein the identifying of the subset of the receive times and the scaled transmit times comprises:
identifying, for each transmit time of the plurality of transmit times, an earliest receive time and a latest receive time,
wherein a difference between the earliest receive time and the transmit time is greater than or equal to a time lag corresponds to the minimum range, and
wherein a difference between the latest receive time and the transmit time is less than or equal to a time lag corresponding to the maximum range.

3. The target acquisition system of claim 2, wherein the identifying the earliest receive time and the latest receive time comprises binary searching the plurality of receive times.

4. The target acquisition system of claim 1, wherein the generating of the scaled transmit times comprises:
generating a first subset of the scaled transmit times by multiplying the subset of the transmit times by a first scaling factor corresponding to a first trial velocity; and
generating a second subset of the scaled transmit times by multiplying the subset of the transmit times by a second scaling factor corresponding to a second trial velocity,
wherein the scaled transmit times comprise the first and second subset of the scaled transmit times.

5. The target acquisition system of claim 4, wherein the first scaling factor $\gamma_v$ is expressed as $\gamma_v = 1 + 2v/c$, where $v$ is the first trial velocity and $c$ is the speed of light.

6. The target acquisition system of claim 1, wherein the cross-correlating the scaled transmit times and the subset of the received times comprises:
generating a plurality of histograms, each one of the plurality of histograms being a histogram of pairwise differences between the subset of the receive times and ones of the scaled transmit times corresponding to one of the plurality of trial target velocities,
wherein the plurality of cross-correlation power values are generated based on values of the plurality of histograms.

7. The target acquisition system of claim 6, wherein the cross-correlating the scaled transmit times and the subset of the received times further comprises:
generating a 2-dimensional array, each row of the 2-dimensional array being a histogram of the plurality of histograms corresponding to a different one of the plurality of trial target velocities,
wherein rows of the 2-dimensional array are sorted based on the trial target velocities.

8. The target acquisition system of claim 7, wherein the 2-dimensional array represents the cross-correlation power values as a function of photon round trip time and velocity.

9. The target acquisition system of claim 6, wherein the pairwise differences between the subset of the receive times and ones of the scaled transmit times are quantized.

10. The target acquisition system of claim 1, wherein the calculating the range and the range-rate of the target comprises:
identifying a peak cross-correlation value from among the plurality of cross-correlation power values, and a lag associated with the peak cross-correlation value;
calculating the range of the target based on the lag; and
calculating the range-rate based on a scaling factor associated with the peak cross-correlation value.

11. The target acquisition system of claim 1, wherein the plurality of transmit times comprise dithered pulse timings from a nominal repetition frequency based on a pulse position modulated code.

12. The target acquisition system of claim 11, wherein the pulse position modulated code has auto-correlation side lobes less than or equal to one.

13. A method of target acquisition comprising:
receiving, by a processor of a target acquisition system, a plurality of transmit times corresponding to a plurality of pulses transmitted toward a target;
receiving, by the processor, a plurality of receive times corresponding to a plurality of photon detection events; and
determining, by the processor, a range of the target and a range-rate of the target by:
identifying a subset of the receive times and a subset of the transmit times, wherein pairwise differences between the subset of the receive times and the subset of the transmit times correspond to roundtrips between a minimum range and a maximum range;
generating scaled transmit times based on the subset of the transmit times and a plurality of trial target velocities relative to the receiver;
cross-correlating the scaled transmit times and the subset of the received times to generate a plurality of cross-correlation power values; and
calculating the range and the range-rate of the target based on the plurality of cross-correlation power values.

14. The method of claim 13, wherein the identifying of the subset of the receive times and the scaled transmit times comprises:
identifying, for each transmit time of the plurality of transmit times, an earliest receive time and a latest receive time,
wherein a difference between the earliest receive time and the transmit time is greater than or equal to a time lag corresponds to the minimum range, and
wherein a difference between the latest receive time and the transmit time is less than or equal to a time lag corresponding to the maximum range.

15. The method of claim 13, wherein the generating of the scaled transmit times comprises:
generating a first subset of the scaled transmit times by multiplying the subset of the transmit times by a first scaling factor corresponding to a first trial velocity; and
generating a second subset of the scaled transmit times by multiplying the subset of the transmit times by a second scaling factor corresponding to a second trial velocity,
wherein the scaled transmit times comprise the first and second subset of the scaled transmit times.

16. The method target of claim 15, wherein the first scaling factor $\gamma_v$ is expressed as $\gamma_v = 1 + 2v/c$, where v is the first trial velocity and c is the speed of light.

17. The method of claim 13, wherein the cross-correlating the scaled transmit times and the subset of the received times comprises:
generating a plurality of histograms, each one of the plurality of histograms being a histogram of pairwise differences between the subset of the receive times and ones of the scaled transmit times corresponding to one of the plurality of trial target velocities,
wherein the plurality of cross-correlation power values are generated based on values of the plurality of histograms.

18. The method of claim 17, wherein the cross-correlating the scaled transmit times and the subset of the received times further comprises:
generating a 2-dimensional array, each row of the 2-dimensional array being a histogram of the plurality of histograms corresponding to a different one of the plurality of trial target velocities,
wherein rows of the 2-dimensional array are sorted based on the trial target velocities.

19. The method of claim 18, wherein the 2-dimensional array represents the cross-correlation power values as a function of photon round trip time and velocity.

20. The method of claim 13, wherein the calculating the range the range-rate of the target comprises:
identifying a peak cross-correlation value from among the plurality of cross-correlation power values, and a lag associated with the peak cross-correlation value;
calculating the range of the target based on the lag; and
calculating the range-rate based on a scaling factor associated with the peak cross-correlation value.

* * * * *